United States Patent
Forte

(10) Patent No.: US 7,622,212 B2
(45) Date of Patent: Nov. 24, 2009

(54) COMPACT ELECTROCHEMICAL CONVERTER

(76) Inventor: Pierre Forte, 8 Rue Ulysse Darracq, F-64100 Bayonne (FR)

( * ) Notice: Subject to any disclaimer, the term of this patent is extended or adjusted under 35 U.S.C. 154(b) by 730 days.

(21) Appl. No.: 11/202,165

(22) Filed: Aug. 12, 2005

(65) Prior Publication Data

US 2006/0159977 A1    Jul. 20, 2006

(30) Foreign Application Priority Data

Jan. 17, 2005  (FR) .................................. 05 50131

(51) Int. Cl.
*H01M 8/24* (2006.01)
(52) U.S. Cl. .............................. 429/34; 429/12; 429/13; 429/32; 429/127; 429/44; 429/38
(58) Field of Classification Search .................. 429/12, 429/13, 34, 32, 127, 44, 38
See application file for complete search history.

(56) References Cited

U.S. PATENT DOCUMENTS

| | | | |
|---|---|---|---|
| 5,336,570 A | 8/1994 | Dodge, Jr. et al. | |
| 5,364,711 A | 11/1994 | Yamada et al. | |
| 5,925,477 A | 7/1999 | Ledjeff et al. | |

| | | | |
|---|---|---|---|
| 2003/0013007 A1 * | 1/2003 | Kaun ........................ 429/94 | |
| 2004/0219412 A1 | 11/2004 | Hidekazu et al. | |

FOREIGN PATENT DOCUMENTS

| | | |
|---|---|---|
| DE | 196 24 887 | 1/1997 |
| EP | 0 482 783 | 4/1992 |
| EP | 1 333 517 | 8/2003 |

OTHER PUBLICATIONS

A. Heinzel et al., "Membrane fuel cells—concepts and system design", Electrochemica Acta, vol. 43, No. 24, 1998, pp. 3817-3820, XP-002340535.
S.J. Lee et al., "Design and fabrication of a micro fuel cell array with "flip-flop" interconnection", Journal of Power Sources, vol. 112, No. 2, Nov. 14, 2002, pp. 410-418, XP004391001.

* cited by examiner

*Primary Examiner*—Jane Rhee
(74) *Attorney, Agent, or Firm*—Young & Thompson

(57) ABSTRACT

An electrochemical converter (1) with protonic membrane, includes a plurality of series-connected unit electrochemical conversion cells (2a, 2b, 2c, . . . ), a first substrate including the protonic membrane having a first surface on which a succession of first deposits is made forming a series of spaced anodes, and a second surface on which a succession of second deposits is made forming a series of spaced cathodes located opposite the anodes, the anodes and cathodes forming a plurality of unit conversion cells (2a, 2b, 2c, . . . ) and connection tracks between a cathode of one unit cell and an anode of an adjacent unit cell, passing through the first substrate between the unit conversion cells.

11 Claims, 3 Drawing Sheets

COMPACT ELECTROCHEMICAL CONVERTER

This invention relates to an electrochemical converter of the compact fuel cell type.

Electrochemical converters of the fuel cell type are devices that combine hydrogen and oxygen without combustion to produce an electric current according to a process that operates opposite to electrolysis and that forms water.

A known converter type is composed of protonic membrane cells.

These cells operate at a low temperature, up to 100° C., comprise membrane electrode assemblies, rigid plates compressing the membrane electrode assemblies, and plates comprising dipolar plates.

The design of a fuel cell must allow supply of the cell with fuel and oxidizer (typically hydrogen and oxygen), allow transport and evacuation of water and inert gases (atmospheric nitrogen and carbon dioxide) produced as residues of the reaction, provide electrodes for supporting the catalyst of the reaction, collect electrical charges and dissipate heat energy.

The thermal and electrical conductivity of the components, the pressure of the reactants, the temperature, the surface of the electrodes, the availability of the catalyst, water management and the geometry are the main factors that affect the performance levels and the yield of a fuel cell or electrochemical converter.

Current fuel cells of the protonic membrane cell (PEM) or phosphoric acid type are based on a design using flat electrodes.

A membrane-electrode subassembly is compressed between two rigid plates, this assembly In order to obtain a given electrical voltage, several elements are placed in series by being stacked. The plates are then called "dipolar plates" in the sense in which they form an electrical connection between two poles (an anode and a cathode) of two separate components.

In order to promote a uniform distribution of the reactants on the surface of said electrodes, gaseous diffusion layers are inserted between the dipolar plates and the electrodes.

The dipolar plates have multiple roles. They must be electrically conductive in order to allow movement of the electrons from the anode of one element to the cathode of the adjacent element, they must be heat-conductive in order to dissipate the heat energy produced by the chemical reaction, must be impermeable to the reactants (especially hydrogen), and must be provided with channels that allow the distribution of the reactant gases to the electrodes and channels that allow circulation of a cooling liquid if necessary.

Moreover, the dipolar plates must be relatively rigid in order to maintain the integrity of the entire cell, must serve as a framework of the cell, must provide support that is resistant enough to apply compression seals there, and must be adequately resistant to corrosion.

Due to these constraints, most bipolar plates are made of very dense graphite or stainless steel. With respect to the complexity of the shapes of the dipolar plates, and, in certain cases, the choice of materials, they constitute a major portion of the cost of a fuel cell (up to 50%). Moreover, the choice of the materials, besides their significant weight, makes them constitute most of the volume of the cell.

Moreover, geometries of the stacking type that are currently used entail use of numerous seals between the plates and the membrane-electrode assemblies, thus making their assembly complex and expensive.

One example of an electrochemical converter comprising a plate fuel cell is described in the document U.S. Pat. No. 5,382,478.

This document describes a device comprising a stack of electrochemical cells and a humidification section located upstream from the active section of the electrochemical part of the device.

As explained above, a device such as described in this document is bulky and comprises especially heavy dipolar plates of complex shape.

Document U.S. Pat. No. 6,063,517 A describes an arrangement suitable for being wound in a spiral for implementing a fuel cell provided with an anode, wound onto itself in a spiral around a first hydrogen delivery tube, a second hydrogen delivery tube at the distal end of the spiral, and a protonic membrane surrounding the anode and the tubes.

Such an arrangement does not allow the production of a compact electrochemical converter or fuel cell that delivers an increased voltage without using dipolar plates.

The object of this invention is to produce an improved protonic membrane electrochemical converter comprising a plurality of unit electrochemical conversion cells connected in series, for which the dipolar plates are replaced by a particular geometry of the device.

To do this, this invention relates mainly to a protonic membrane electrochemical converter comprising a plurality of series-connected electrochemical cells, characterized in that it comprises a first Substrate in the form of a continuous strip, and second substrates in the form of strip segments, the first substrate comprising a first surface on which a succession of first deposits is made forming a series of spaced anodes, and a second surface on which a succession of second deposits is made forming a series of spaced cathodes located opposite said anodes, said anodes and cathodes forming a succession of unit conversion cells, the first substrate being provided with a succession of passages through the second substrates, the second substrates being dimensioned to implement a connection track between the cathode of one unit cell and an anode of an adjacent unit cell.

The elimination of dipolar plates according to the invention allows a major increase of mass and major simplification of the fuel cells; this allows in particular significant increase of the energy density of the cell and thus of its power/mass ratio.

The implementation of the passages and use of second substrates crossing the first substrate to implement connection tracks between an anode and a cathode of adjacent cells allows implementation of an electrochemical converter that delivers significant voltage in a small volume.

Other characteristics and advantages of the invention will be better understood from reading the description of a non-limiting embodiment of the invention with reference to the following figures.

Figure 1:
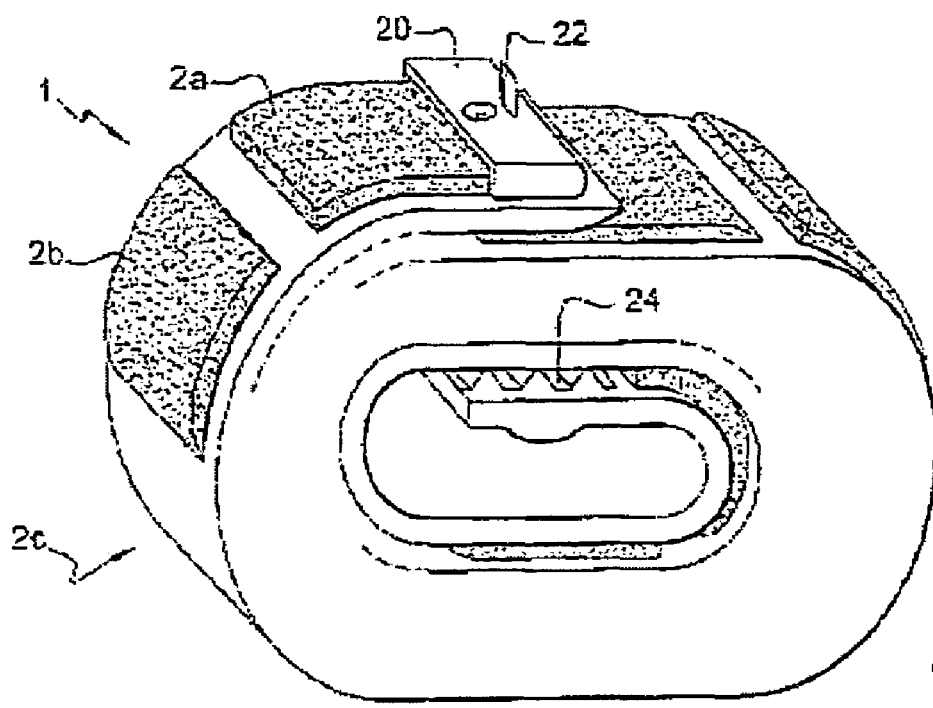
FIG. 1 shows an external diagrammatic view of a fuel cell according to the invention.

The first advantage of the electrochemical converter or fuel cell according to the invention that is shown in FIG. 1 is the absence of dipolar plates.

In contrast to classic geometry in which the dipolar plates comprise the framework of the cell, impart its shape and its structural resistance, and support the membrane elements and the electrodes, the cell according to the invention is flexible and is shaped only when the assembly is completed.

To produce the electrochemical converter 1 from FIG. 1, the invention includes as a starting component a protonic membrane that supports all the electrodes of the cell and constitutes the critical part of the body of the cell.

Figure 2:
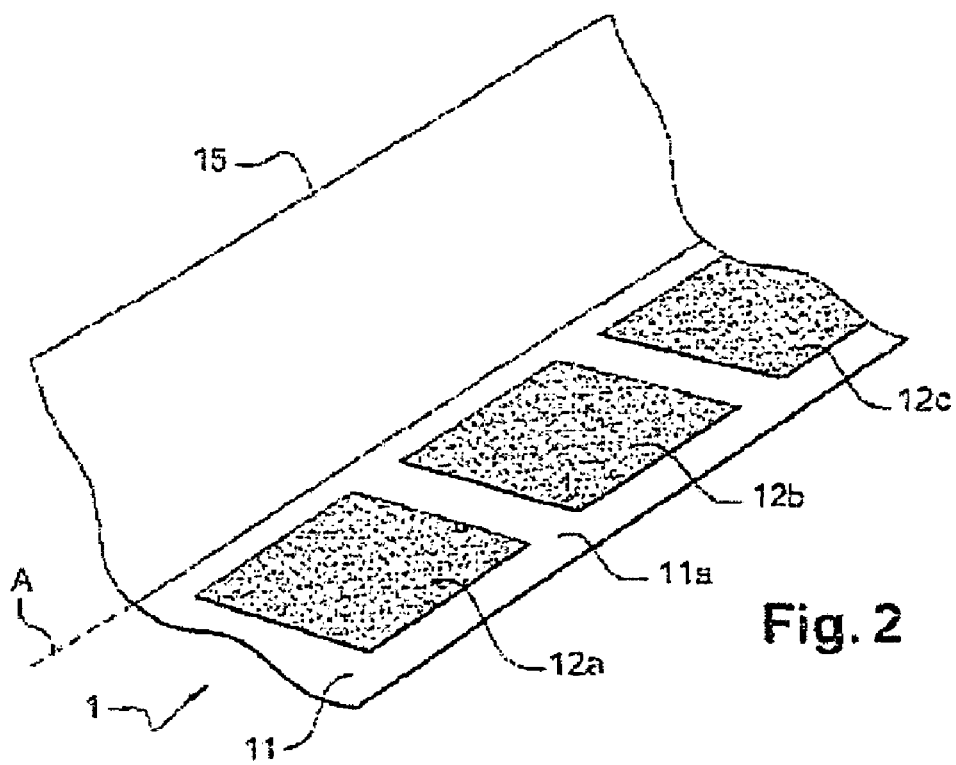
FIG. 2 shows a perspective view of one segment of a first substrate for production of the cell from FIG. 1.

The protonic membrane shown in FIG. 2 is produced based on a first substrate 11 that comprises said membrane.

Figure 3A:
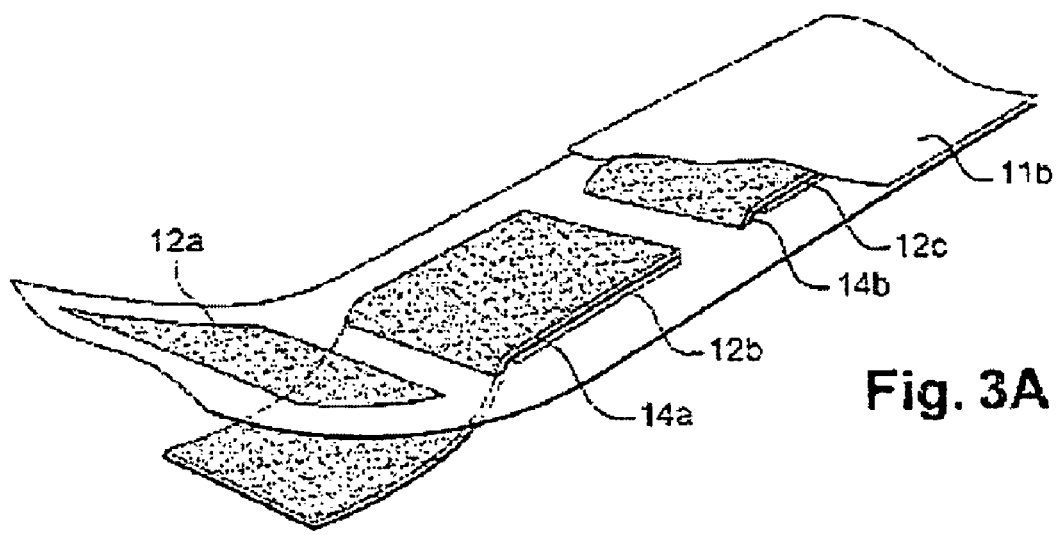
FIGS. 3A and 3B show an exploded view and a side view respectively of the conversion cells produced on the segment of FIG. 2.
Figure 3B:
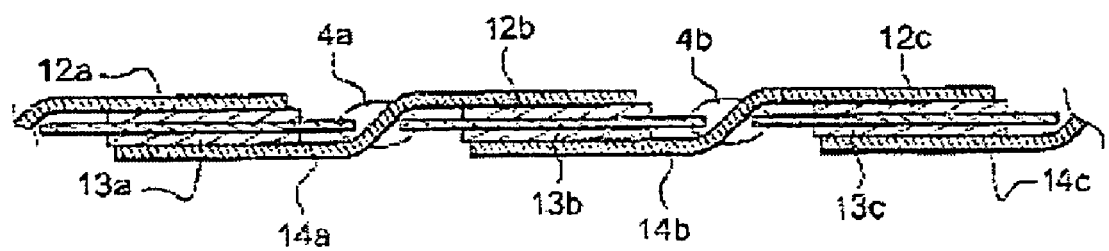
Figure 4A:
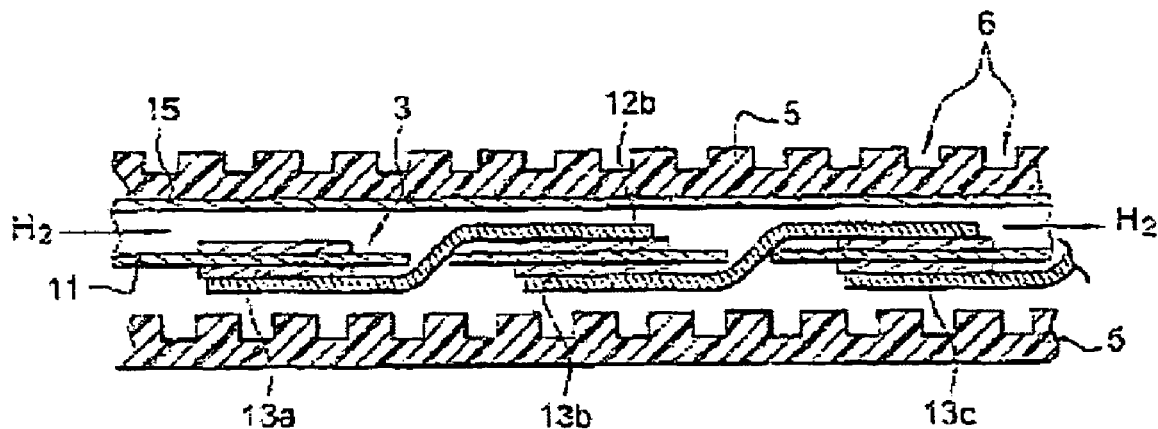
FIGS. 4A and 4B show cutaway views from the side and front, respectively, of a segment of the cell from FIG. 1.

This substrate shown in a side view in FIG. 3B and FIG. 4A comprises a first surface 11a, on which a succession of first deposits forming a series of spaced anodes 12a, 12b, 12c, . . . is produced, and a second surface on which a succession of second deposits forming a series of spaced cathodes 13a, 13b, 13c, . . . that are placed opposite said anodes is produced, said anodes and cathodes forming a plurality of unit conversion cells 2a, 2b, 2c, . . . connected in series.

The arrangement of the unit conversion cells is provided such that the anodes 12a, 12b, 12c, . . . are aligned with the same surface of the protonic membrane 11a and 11b. All of the cathodes 13a, 13b, and 13c are aligned with the opposing surface of the membrane and are exactly symmetrical to the anodes relative to the plane formed by the membrane 11a.

In order to place the elements in series, it is necessary to electrically connect a cathode to the adjacent anode located on the opposite surface of the membrane, for example 13a and 12b. This link is made by using tracks that cross the first substrate.

According to the invention and as shown especially in FIG. 3A, tracks 14a, 14b, 14c, . . . cross the first substrate 11 between said unit conversion cells for implementing the connection between a cathode of one unit cell and an anode of an adjacent unit cell.

One of the advantageous characteristics of the invention is the use of combined means of connection between unit cells and gaseous diffusion.

To do this, the tracks 14a, 14b, 14c . . . are composed of strips that form gaseous diffusion layers and that cross the first substrate by passage zones (4a, 4b, . . . ), these gaseous diffusion layers being produced in particular in a second substrate of the metal-coated porous polymer tissue type for making it conductive and thus producing the connection tracks between the unit cells.

Such a substrate is preferred to carbon tissues that are classically used for gaseous diffusion layers that do not have sufficient conductivity.

To implement sealing between the surface accommodating the anodes and the surface accommodating the cathodes, and between the different compartments of the cell, a process of heat sealing or cementing of materials at the level of the passages 4a, 4b . . . is provided.

The gaseous diffusion layers 14a, 14b, 14c . . . produced in a very porous polymer tissue are metal-coated with a nickel-based alloy for making them conductive such that they comprise the connection tracks of the successive unit cells.

The tracks preferably have a thickness that varies from 100 μm to several tens of millimeters, determined as a function of electrical characteristics, mechanical characteristics (flexibility), and transport of the fluids under study.

As described above, the tracks are fixed on the membrane at the level of the passages by application of an adhesive or by heat-sealing the material comprising the track and the material comprising the membrane.

This same process is used to make this zone of the membrane impermeable to the reactant gases, and thus the passage zones 4a, 4b, . . . are rendered gas-tight.

Since the metal-coated gaseous diffusion layer is intrinsically conductive, the electrical current can circulate between adjacent cells, but the gases cannot cross the membrane from one surface to another at the level of the sealed passages.

Advantageously, the tracks according to the invention can only be held on the membrane by their middle part and are kept in contact with the electrodes by the pressure applied by the different layers of the strip when the latter is wound onto itself; this simplifies assembly and limits the number of materials comprising the cell.

If this proves necessary for assembly operations, the tracks can be kept in contact with the first substrate over their entire length by using an adhesive product.

The materials used to produce this fuel cell must resist corrosion in an acid environment, offer good electrical conductivity when the material is not specified as insulating, and allow rapid permeation of oxygen or air at the level of the cathode and of hydrogen at the level of the anode.

The material selected for the strip bearing the anodes and the cathodes must be porous enough to allow the H+ ions to cross the strip between the anodes and the cathodes of the unit cells.

To prevent dispersion of the hydrogen from the anodic side of the first substrate, the anodes must be encapsulated and insulated from the immediate environment of the cell.

To do this, according to one advantageous embodiment of the invention shown in particular in FIG. 2, the membrane is formed from two parts, the first substrate comprising a first lateral strip 11 comprising the deposits, and a second lateral strip 15 with no deposits, winding along a longitudinal axis (A) on the first lateral strip 11 and sealed on the first lateral strip so as to enclose the anodes 12a, 12b, 12c, . . . in a tubular duct that forms a first channeling means 3 in which the hydrogen circulates.

The first strip 11 supports the electrodes on these two surfaces as described above, the second strip 15, of the same width as the part 11, as shown in FIG. 3A allows the upper part of the strip 11 to be completely covered once it is folded in two. The thickness of the first substrate can vary in thicknesses from roughly 25 to 100 μm as a function of the desired electrochemical characteristics and mechanical resistance. The material that is used to implement the first substrate and for which it has its protonic membrane function is composed of a thermoplastic material comprising a molecular structure that promotes H+ ion transport.

The lower surface of the membrane comprising the cathodes can remain exposed to the open air because the cell uses ambient air to provide oxygen to the chemical reaction. Encapsulation of the surface comprising the anodes, which is done by folding the strip 15 of the membrane onto the upper surface of the strip 11, implements a hydrogen circulation duct. The near edges of the strip 15 and the strip 11 are then heat-sealed or cemented to seal the duct.

Once the anodes are encapsulated, the hydrogen can freely circulate over the entire length of the strip.

The geometry of the cell should, moreover, allow the air to laterally cross the unit formed by the strip wound onto itself.

The hydrogen crosses the gaseous diffusion layers at the level of the anodes and circulates by taking the free volumes arranged along the gaseous diffusion layers of the anode side and between the successive anodes.

According to the invention, the first substrate 11, 15 is composed of a flexible material wound onto itself in a spiral.

The duct that has been formed in this way can inflate under the action of the hydrogen pressure during its circulation, and the deformation of the membrane under pressure will naturally be limited by the compression applied by the different layers formed by winding of the first substrate.

The local deformations can be eliminated, if necessary, by local hot sealing of the strips 11 and 15 of the protonic membrane.

According to an advantageous embodiment of the invention, the cathodic reaction air laterally crosses the spiral formed by the strip.

To do this, the converter according to the invention comprises second channeling means 5 arranged to channel an air flow on the surface comprising the cathodes in one direction perpendicular to the longitudinal axis (A) of the continuous strip.

According to FIG. 4A, the second channeling means are produced using a support element running along the surface of the first substrate comprising the cathodes 13a, 13b, 13c . . . , this support element being provided with grooves 6 perpendicular to the longitudinal axis that routes the air perpendicular to the longitudinal axis of the first substrate.

In order to facilitate the flow of air, the passage section of the grooves can be enlarged. The support 5 can assume different forms such as that of a corrugated or grooved film. The support 5 will always be implemented in an electrical insulating material in order not to connect the cathodes between one another. Its height will be defined as a function of the desired air passage section.

Figure 4B:
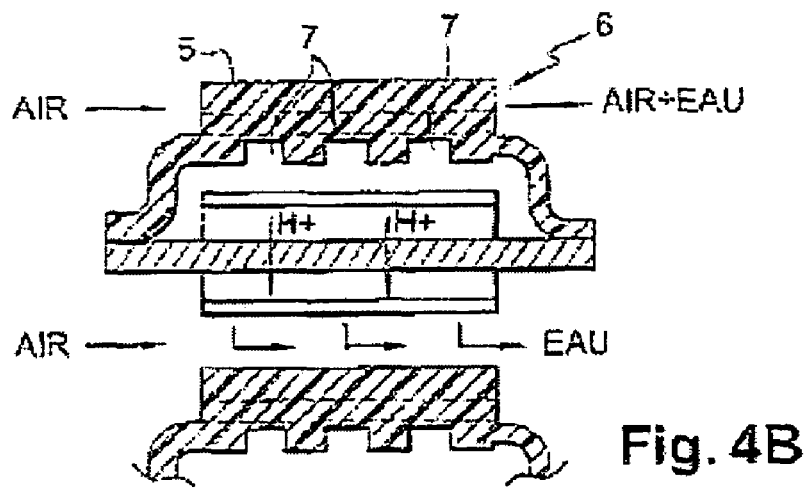

In the variant shown in FIG. 4B, the support element is integral with the external surface of the second strip 15 that in this case is a doubled strip, and the internal surface of this strip is itself provided with longitudinal grooves to facilitate circulation of the hydrogen along the anodes.

As a variant, the strip 15 can be integral with the strip 11 and enclosed between two layers of grooved electrical insulating material, the lower layer being grooved lengthwise and the external layer being grooved transversely.

Figure 5:
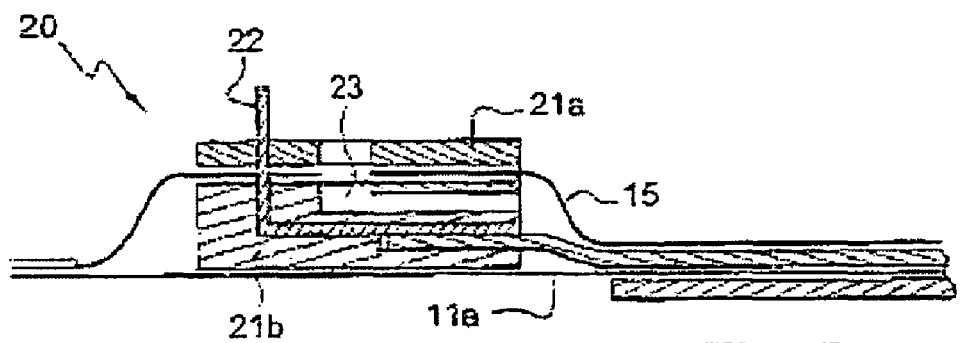
FIG. 5 shows an embodiment of a termination of the cell from FIG. 1.

One example of the termination of the converter according to the invention is shown in FIG. 5. The device 20 is inserted at the two ends of the strip in order to inject hydrogen into the sealed first channeling means 3 and in order to collect the current on the first anode (negative pole) and on the last cathode (positive pole). The device 20 is provided with an insert 21a and a closing plate 21b. The insert 21b is placed within the duct carrying the hydrogen.

The insert is thin enough to limit the deformation of the membrane at the level of its termination to a maximum.

The insert comprises a line 23 for routing the hydrogen, whose dimensions are defined as a function of the maximum consumption of the cell.

The insert, moreover, comprises an electrical contact 22 that is dimensioned as a function of the maximum values of the current generated by the cell and is connected to the first anode or the last cathode.

A hydrogen feed duct is placed at the two ends of the cell so as to supply fuel to the cell by the two ends if its consumption is significant and/or to allow the hydrogen zone of the cell to be purged when it is not in operation.

The two devices are provided with suitable seals at the level of the junction between the insert and the closing plate 21b between which the strip 15 of the membrane is held to maintain the tightness of the system.

The assembly that is shown in FIG. 1 and that is formed by the membrane-electrode assembly, the gaseous diffusion layers and the injection/collection inserts 20, is flexible and can be wound onto itself without forming parasitic or unwanted connections between the different anodes and cathodes. The strip will preferably be wound around an oval or cylindrical matrix in which a space will be provided for accommodating the internal device 20. Likewise, a ring can surround the strip so as to insulate the anodes placed on the outer surface of the spiral from the surroundings of the cell. The ring likewise provides mechanical resistance and the compressive force necessary to maintain the integrity of the spiral and electrical contact between the diffusion layers and the electrodes. The ring has a fitting for accommodating the exterior device 20. The matrix and the ring are made of a light, mechanically resistant, and electrically insulating material.

Winding the strip into a spiral that groups a plurality of unit cells connected in series according to the invention yields several advantages that are mainly greater compactness of the assembly, better thermal diffusion in the body of the cell, and thus better thermal homogeneity, a large membrane surface area in contact at the same time with the cathodic air and anodic hydrogen, that allows an increase in the transport of water through the membrane and the transport of humid air toward the dry hydrogen; this promotes the stability of humidification of the membrane. Moreover, the number of cells can be modified by lengthening or shortening the strip without changing the general design of the cell, to the extent that the external ring has adjustable dimensions.

The protonic membrane of the converter according to the invention can in particular be a membrane based on carbon-containing and teflon chains on which $HSO_3$ terminations are grafted for transport of $H^+$ ions, whereby the cathodes and the anodes can be based on graphite and platinum powder deposited on the membrane.

The unit cells that are obtained provide a potential difference of roughly 0.7 V and an amperage of roughly 300 $mA/cm^2$.

The arrangement of the cell makes it possible to reduce the cost of the cell, reduce its weight, reduce its volume, and reduce the number of assembly operations, and it offers an enlarged surface area for exchange of water between the reactants, thus promoting hydration of the membrane.

According to FIG. 4B, the strip 15 is a doubled element comprising the above-described grooves.

The invention is not limited to the embodiments described, and especially the strip 15 can be produced in a flexible and elastic material such as a molded elastomer.

The invention claimed is

1. Electrochemical converter (1) with protonic membrane, comprising a plurality of series-connected, unit electrochemical conversion cells (2a, 2b, 2c, . . . ), characterized in that it comprises a first substrate (11, 15) comprising the protonic membrane, comprising a first surface (11a) on which a succession of first deposits is made forming a series of spaced anodes (12a, 12b, 12c, . . . ), and a second surface on which a succession of second deposits is made forming a series of spaced cathodes (13a, 13b, 13c, . . . ) located opposite said anodes, said anodes and cathodes forming a plurality of unit conversion cells (2a, 2b, 2c, . . . ), and in that it comprises connection tracks (14a, 14b, 14c, . . . ) between a cathode of one unit cell and an anode of an adjacent unit cell, passing through the first substrate (11, 15) between said unit conversion cells, wherein the first substrate comprises a first lateral strip (11) comprising the deposits, and a second lateral strip (15), with no deposits, winding along a longitudinal axis (A) on the first lateral strip (11) and sealed on the first lateral strip so as to enclose the anodes (12a, 12b, 12c, . . . ) in a tubular duct that forms a first channeling means (3) in which the hydrogen circulates.

2. Electrochemical converter according to claim 1, wherein the first substrate (11) is composed of a flexible material wound onto itself in a spiral.

3. Electrochemical converter according to claim 1, wherein the tracks (14a, 14b, 14c, . . . ) are composed of strips that form gaseous diffusion layers and that pass through the first substrate by passage zones (4a, 4b, . . . ).

4. Electrochemical converter according to claim 3, wherein the gaseous diffusion layers are composed of a second porous polymer substrate that is metal-coated to make it conductive.

5. Electrochemical converter according to claim 3, wherein the passage zones (4a, 4b, . . . ) are made gas-tight.

6. Electrochemical converter according to claim 1, wherein the first substrate is composed of a thermoplastic material comprising a molecular structure that promotes $H^+$ ion transport.

7. Electrochemical converter according to claim 1, wherein it comprises second channeling means (5) arranged for channeling an air flow on the surface comprising the cathodes in a direction perpendicular to the longitudinal axis (A) of the continuous strip.

8. Electrochemical converter according to claim 7, wherein the second channeling means (5) comprises a support element provided with grooves (6) perpendicular to the longitudinal axis.

9. Electrochemical converter according to claim 8, wherein the support element is an external surface of the second strip (15).

10. Electrochemical converter according to claim 4, wherein the passage zones (4a, 4b, . . . ) are made gas-tight.

11. Electrochemical converter (1) with protonic membrane, comprising a plurality of series-connected, unit electrochemical conversion cells (2a, 2b, 2c, . . . ), characterized in that it comprises a first substrate (11, 15) comprising the protonic membrane, comprising a first surface (11a) on which a succession of first deposits is made forming a series of spaced anodes (12a, 12b, 12c, . . . ), and a second surface on which a succession of second deposits is made forming a series of spaced cathodes (13a, 13b, 13c, . . . ) located opposite said anodes, said anodes and cathodes forming a plurality of unit conversion cells (2a, 2b, 2c, . . . ), and in that it comprises connection tracks (14a, 14b, 14c, . . . ) between a cathode of one unit cell and an anode of an adjacent unit cell, passing through the first substrate (11, 15) between said unit conversion cells, wherein the first substrate (11) is composed of a flexible material wound onto itself in a spiral.

* * * * *

UNITED STATES PATENT AND TRADEMARK OFFICE
CERTIFICATE OF CORRECTION

PATENT NO. : 7,622,212 B2  Page 1 of 1
APPLICATION NO. : 11/202165
DATED : November 24, 2009
INVENTOR(S) : Pierre Forte It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1056 days.

Signed and Sealed this

Fourteenth Day of December, 2010

David J. Kappos
*Director of the United States Patent and Trademark Office*